(12) United States Patent
Perroni et al.

(10) Patent No.: US 12,351,471 B2
(45) Date of Patent: Jul. 8, 2025

(54) LITHIUM PURIFICATION AND CONVERSION

(71) Applicant: Schlumberger Technology Corporation, Sugar Land, TX (US)

(72) Inventors: Dominic Vincent Perroni, Sugar Land, TX (US); Gary W. Sams, Houston, TX (US); Florence Binet, Houston, TX (US); Rod William Shampine, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/673,417

(22) Filed: May 24, 2024

(65) Prior Publication Data
US 2024/0308865 A1  Sep. 19, 2024

Related U.S. Application Data

(60) Division of application No. 18/060,735, filed on Dec. 1, 2022, now Pat. No. 12,215,035, which is a
(Continued)

(51) Int. Cl.
*C01D 15/04*  (2006.01)
*B01D 61/02*  (2006.01)
(Continued)

(52) U.S. Cl.
CPC ........... *C01D 15/04* (2013.01); *B01D 61/026* (2022.08); *C01D 15/02* (2013.01); *C01D 15/08* (2013.01);
(Continued)

(58) Field of Classification Search
CPC ........ C01D 15/04; C01D 15/02; C01D 15/08; B01D 61/026; B01D 2311/2512;
(Continued)

(56) References Cited

U.S. PATENT DOCUMENTS

| 3,306,700 A | 2/1967 | Neipert |
| 4,291,001 A | 9/1981 | Repsher |

(Continued)

FOREIGN PATENT DOCUMENTS

| CN | 1511964 A | 7/2004 |
| CN | 104313348 A | 1/2015 |

(Continued)

OTHER PUBLICATIONS

Xu, W. et al., "A Comprehensive Membrane Process for Preparing Lithium Carbonate from High Mg/Li Brine", Membranes, 2020, 10, 14 pages.
(Continued)

*Primary Examiner* — Anthony J Zimmer
*Assistant Examiner* — Syed T Iqbal
(74) *Attorney, Agent, or Firm* — Jeffrey D. Frantz

(57) ABSTRACT

Lithium recovery processes are described using concentration and conversion techniques. A vaporizer or membrane can be used to concentrate lithium and precipitate impurities. A conversion process can be used to replace anions in lithium bearing streams by adding a second anion and precipitating lithium in a salt with the second anion. Rotary separation can be used to separate the precipitated lithium salt.

7 Claims, 7 Drawing Sheets

Related U.S. Application Data continuation-in-part of application No. 17/815,593, filed on Jul. 28, 2022, now abandoned.

(60) Provisional application No. 63/203,777, filed on Jul. 30, 2021.

(51) Int. Cl.
| | |
|---|---|
| *C01D 15/02* | (2006.01) |
| *C01D 15/08* | (2006.01) |
| *C02F 1/44* | (2023.01) |
| *C02F 101/10* | (2006.01) |

(52) U.S. Cl.
CPC ...... *C02F 1/441* (2013.01); *B01D 2311/2512* (2022.08); *B01D 2315/24* (2022.08); *B01D 2317/022* (2013.01); *C02F 2101/10* (2013.01); *C02F 2301/046* (2013.01); *C02F 2301/08* (2013.01)

(58) Field of Classification Search
CPC .......... B01D 2315/24; B01D 2317/022; C02F 1/441; C02F 2101/10; C02F 2301/046; C02F 2301/08; C01P 2006/80; C01F 11/18
See application file for complete search history.

(56) References Cited

U.S. PATENT DOCUMENTS

| | | | |
|---|---|---|---|
| 4,727,936 | A | 3/1988 | Mioduszewski |
| 5,681,477 | A | 10/1997 | Leavitt |
| 5,833,844 | A | 11/1998 | Leavitt |
| 6,073,448 | A | 6/2000 | Lozada |
| 9,068,247 | B2 | 6/2015 | Marston |
| 9,976,417 | B2 | 5/2018 | Mahavadi |
| 10,018,590 | B2 | 7/2018 | Mahavadi |
| 11,169,114 | B2 | 11/2021 | Mahavadi |
| 11,298,658 | B2 | 4/2022 | Wohlert |
| 11,365,128 | B2 | 6/2022 | Marston |
| 11,941,128 | B2 | 3/2024 | Andersen |
| 2003/0132113 | A1 | 7/2003 | Sarme |
| 2006/0163069 | A1 | 7/2006 | Prak |
| 2009/0269767 | A1 | 10/2009 | Soderlund |
| 2010/0068605 | A1 | 3/2010 | Harris |
| 2011/0174739 | A1 | 7/2011 | Chung |
| 2013/0205778 | A1 | 8/2013 | Hansen |
| 2014/0048485 | A1 | 2/2014 | Jacobs |
| 2014/0076734 | A1 | 3/2014 | Calvo |
| 2014/0239224 | A1 | 8/2014 | Burba |
| 2015/0114837 | A1 | 4/2015 | Mahavadi |
| 2015/0197830 | A1 | 7/2015 | Chon |
| 2017/0045476 | A1 | 2/2017 | Mahavadi |
| 2017/0102370 | A1 | 4/2017 | Alber |
| 2018/0016153 | A1 | 1/2018 | Sharma |
| 2018/0147532 | A1 * | 5/2018 | Switzer ................. B01D 61/58 |
| 2018/0207584 | A1 * | 7/2018 | Chang ................. B01D 61/025 |
| 2018/0245180 | A1 | 8/2018 | Cheng |
| 2019/0120791 | A1 | 4/2019 | Al-Gouhi |
| 2019/0226336 | A1 | 7/2019 | Benson |
| 2019/0248667 | A1 | 8/2019 | Featherstone |
| 2019/0256368 | A1 | 8/2019 | Marston |
| 2020/0047124 | A1 | 2/2020 | Bhave |
| 2020/0086271 | A1 | 3/2020 | Harrison |
| 2020/0189924 | A1 | 6/2020 | Featherstone |
| 2020/0283921 | A1 | 9/2020 | Mislan |
| 2020/0299805 | A1 * | 9/2020 | McEachern ............. B01J 20/18 |
| 2020/0316557 | A1 | 10/2020 | Boualleg |
| 2020/0399772 | A1 | 12/2020 | Kiggins |
| 2021/0086400 | A1 | 3/2021 | Andersen |
| 2021/0087697 | A1 | 3/2021 | Riabtsev |
| 2022/0055910 | A1 | 2/2022 | Jariwala |
| 2023/0032153 | A1 | 2/2023 | Sams |
| 2023/0086861 | A1 | 3/2023 | Perroni |
| 2023/0088458 | A1 | 3/2023 | Sams |

FOREIGN PATENT DOCUMENTS

| | | | | |
|---|---|---|---|---|
| JP | 2011032151 | A | 2/2011 | |
| JP | 2018172775 | A | 11/2018 | |
| RU | 2688593 | C1 | 5/2019 | |
| WO | 2006103312 | A1 | 10/2006 | |
| WO | 2012044163 | A1 | 4/2012 | |
| WO | 2018081506 | A1 | 5/2018 | |
| WO | 2018183555 | A1 | 10/2018 | |
| WO | 2018190754 | A2 | 10/2018 | |
| WO | 2019221932 | A1 | 11/2019 | |
| WO | WO-2021061343 | A1 * | 4/2021 | ............. B01D 61/04 |
| WO | 2021160240 | A1 | 8/2021 | |
| WO | 2021228936 | A1 | 11/2021 | |
| WO | 2022040630 | A1 | 2/2022 | |
| WO | 2022203706 | A1 | 9/2022 | |
| WO | 2023009887 | A1 | 2/2023 | |
| WO | 2023009888 | A1 | 2/2023 | |
| WO | 2023022627 | A1 | 2/2023 | |
| WO | 2023177994 | A1 | 9/2023 | |
| WO | 2023183546 | A1 | 9/2023 | |

OTHER PUBLICATIONS

Kumar, A. et al., "Metals Recovery from Seawater Desalination Brines: Technologies, Opportunities and Challenges", ACS Sustainable Chemistry Engineering 2021, 9, 7704-7712.

Zhao, X. et al., "Review on the electrochemical extraction of lithium from seawater/brine", Journal of Electroanalytical Chemistry 2019, 850, 113389, 13 pages.

Yang, S. et al., "Lithium Mteal Extraction from Seawater", Joule, 2018, 2, pp. 1648-1651.

Liu, C. et al., "Lithium Extraction from Seawater through Pulsed Electrochemical Intercalation", Joule 2020, 4, pp. 1459-1469.

Li, Z. et al., "Continuous electrical pumping membrane process for seawater lithium mining", Energy Environmental Science 2021, 14, pp. 3152-3159.

Refrigeration, https://energyrecovery.com/refrigeration/, downloaded on Aug. 14, 2021 (5 pages).

Ferrara et al., (2015) A Small Power recovery expander for heat pump COP improvement, Energy Procedia 81 (015) 1151-1159.

Turbomachine expander offers efficient, safe strategy for heating, cooling, https://www.purdue.edu/newsroom/releases/2020/Q1/turbomachine-expander-offers-efficient,-safe-strategy-for-heating,-cooling.html, downloaded on Aug. 15, 2021 (5 pages).

Turkia, et al., Online Capillary Electophoresis for Monitoring Carboxylic Acid Production by Yeast during Bioreactor Cultivations, Anal. Chem. 2013, 85, 9705-97.

Watercycle Technologies, "Technology", 2022, accessed Sep. 19, 2024, https://www.watercycletechnologies.com/technology, 6 pages.

KMX Technologies, "Technology", 2024, accessed Sep. 19, 2024, https://kmxtechnologies.com/kmx-technology/, 9 pages.

* cited by examiner

LITHIUM PURIFICATION AND CONVERSION

CROSS-REFERENCE TO RELATED APPLICATIONS

This patent application is a divisional of U.S. patent application Ser. No. 18/060,735, filed Dec. 1, 2022, which is a continuation-in-part of U.S. patent application Ser. No. 17/815,593, filed Jul. 28, 2022, which claims the benefit of U.S. Provisional Patent Application No. 63/203,777 filed Jul. 30, 2021. Each of the above applications is incorporated herein by reference in its entirety.

FIELD

This patent application describes methods and apparatus for lithium recovery from aqueous sources. Specifically, processes and apparatus for concentrating and converting lithium in brine streams is described.

BACKGROUND

Lithium is a key element in energy storage. Electrical storage devices, such as batteries, supercapacitors, and other devices commonly use lithium to mediate the storage and release of chemical potential energy as electrical current. As demand for renewable, but non-transportable, energy sources such as solar and wind energy grows, demand for technologies to store energy generated using such sources also grows.

According to the United States Geological Survey, global reserves of lithium total 21 million tons (metric) of lithium content, with Chile, Australia, Argentina, and China accounting for about 82% of global reserves. U.S. Geological Survey, Mineral Commodity Summaries, January 2021. Global production of lithium content was 82 kT in 2020 and 86 KT in 2019. Global consumption was estimated at 56 kT in both 2019 and 2020. Id. By one estimate, global lithium demand is expected to reach 1.79 MTa of lithium carbonate equivalent, which is approximately 339 kTa of lithium content, by 2030 for an average annual growth in demand of approximately 22%. Supply is currently forecast to run behind demand, with lithium prices expected to triple by 2025, by some estimates. The incentive for more lithium production could not be clearer.

The mining industry has numerous techniques for the extraction of lithium from mineral or saline waters. Hard rock mining with acid digestion is common, but labor intensive. Methods currently used for salar lakes involve evaporation ponds with chemical additives to selectively precipitate the lithium. This process requires months to complete and typically recovers roughly 50-60% of the original lithium.

In recent years, companies are investigating improved methods to recover lithium directly from salar lakes that avoid pond evaporation, are faster and have high lithium yield. Many techniques use adsorbents that selectively recover lithium, followed by a wash step that liberates the lithium for further processing. Solid and liquid adsorbents are used. Processing brine streams involves handling large volumes of water to access the lithium contained in the brine. Efficient and effective means of separating lithium from water are needed.

SUMMARY

Embodiments described herein provide method of recovering lithium from a brine source. The method comprises extracting lithium from the brine source using an ion withdrawal process to form a lithium extract. It also includes concentrating the lithium extract using a first membrane separation operation, having a first semi-permeable membrane to yield a preconcentrated stream and a permeate stream, and concentrating the preconcentrated stream using a second membrane separation operation. The second membrane separation operation is configured so that the preconcentrated stream flows into a plurality of reactors in series, each containing a semi-permeable membrane separating the reactor into a first volume and a second volume. The preconcentrated stream flows sequentially as a non-permeating stream into the first volume of each reactor. The non-permeating stream exiting the plurality of reactors yields a lithium concentrate. The second membrane operation also yields a dilute brine stream that exits the second volume of at least one of the reactors. The dilute brine stream is recycled into the first membrane separation operation.

Other embodiments described herein provide a method of recovering lithium from a brine source, comprising extracting lithium from the brine source using an ion withdrawal process to form a lithium extract. The method also includes concentrating a stream derived from the lithium extract using a counter-flow reverse osmosis operation, to yield a lithium concentrate and a dilute brine stream as well as using a reverse osmosis operation to separate the dilute brine stream into two streams including a permeate stream, and recycling the permeate stream into another stream used in the method.

Other embodiments described herein provide a method of recovering lithium from a brine source. The method includes extracting lithium from the brine source using an ion withdrawal process to form a lithium extract; and concentrating the lithium extract using one or more operations including at least a membrane separation operation. The membrane separation operation includes a plurality of reactors in series each having a semi-permeable membrane. It yields a lithium concentrate and a dilute brine stream, and is configured so that the lithium concentrate has a TDS over 120,000 mg/l, preferably over 200,000 mg/l. The method also includes separating the dilute brine stream using a semi-permeable membrane into two streams including a permeate stream, wherein the permeate stream has a TDS under 2,000 mg/l, preferably under 500 mg/l, and recycling the permeate stream into another stream.

DETAILED DESCRIPTION

Figure 1:
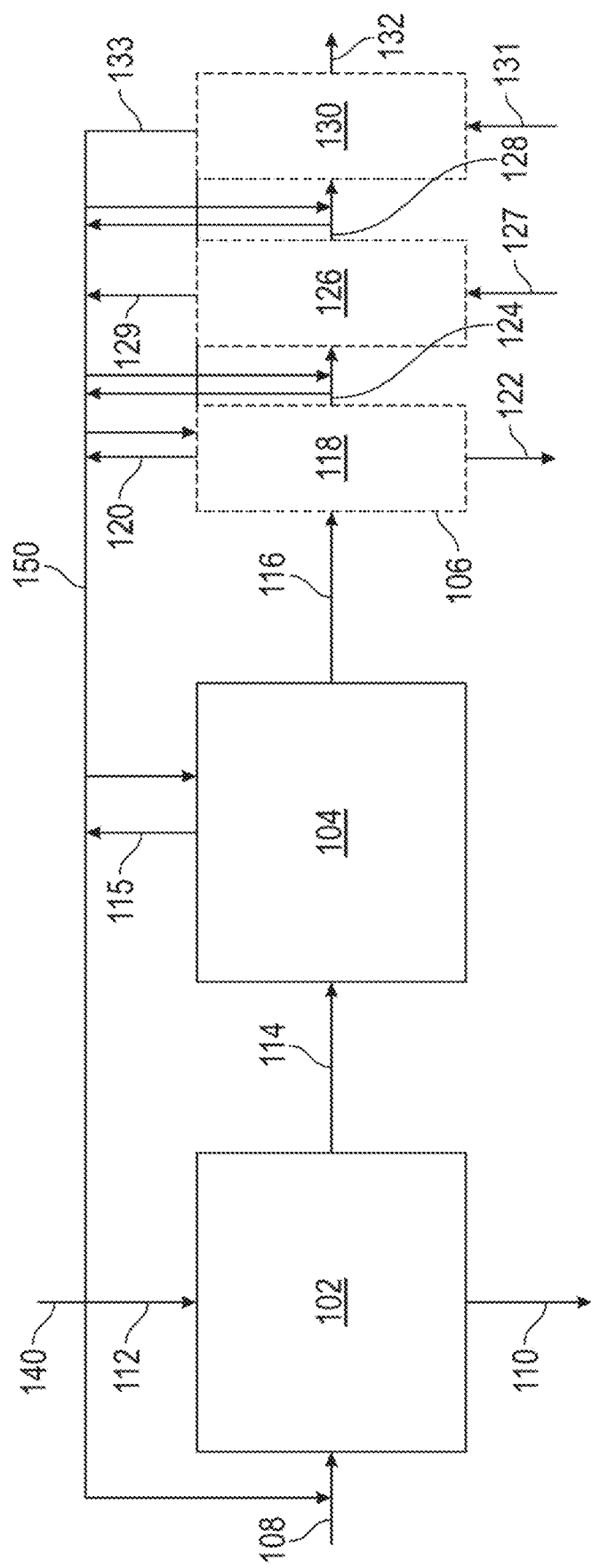
FIG. 1 is a process diagram summarizing a lithium recovery process according to one embodiment.

FIG. 1 is a process diagram summarizing a lithium recovery process 100 according to one embodiment. The process 100 has an ion withdrawal stage, such as an extraction stage 102, a concentration stage 104, and a conversion stage 106. In the extraction stage 102, an aqueous stream containing lithium, typically mostly lithium chloride, is contacted with a lithium-selective medium, which may be liquid or solid. The medium withdraws lithium from the aqueous stream, which is returned to the environment depleted of lithium. The medium may adsorb or absorb lithium from the aqueous stream. The process of withdrawing lithium from the aqueous stream is an ion withdrawal process wherein lithium ions, and lower amounts of other ions, are withdrawn from the aqueous solution into the medium, either at the surface of a solid medium, into the interior of a solid medium, or into a liquid medium.

In an embodiment where the medium is a solid (such as metal oxide, metal hydroxide or such material mixed with a resin, the medium may be stationary or fluidized within the vessel, or conveyed through one or more vessels or zones for contacting with the brine, for example in a counter-current format. In particular, the medium may be contained in a plurality of vessels in flow communication with one another and the vessels may be fluidly connected with a plurality of zones (ie inlets/outlets) during the extraction process. The extraction 102 may therefore take place continuously, for instance loading resin in a first vessel with lithium by fluidly connecting this vessel with the brine source while unloading resin in a second vessel by fluidly connecting the second vessel with the eluent and washing a third vessel using a strip solution. The extraction may be continuous counter-current adsorption desorption (CCAD). An exemplary counter-current adsorption desorption that may be used is for instance described in U.S. Pat. No. 11,365,128 from EnergySource Minerals hereby incorporated by reference.

A brine source stream 108 is provided to the extraction stage 102 for contacting with the lithium selective medium. A lithium depleted brine stream 110 exits the extraction stage 102 for return to the environment. The lithium depleted brine stream 110 may be treated before return to the environment, for example using a filtration or other separation process (e.g. filtering, settling, centrifugation) to remove any impurities. The lithium depleted brine stream may be separated into a reject stream and a fresh water stream using at least a membrane separation operation having a semi-permeable membrane, or a thermal vaporizer such as the vaporizer 118 described in this disclosure. The reject stream may be returned to the environment (ie reinjected into the geological formation) and the fresh water stream may be recycled into another stream, such as the eluent. When a membrane separation operation is deployed it may be configured to perform electrodialysis, reverse osmosis, counter-flow reverse osmosis, or a combination of both reverse osmosis and counter-flow reverse osmosis such as described in relationship with operations 502, 504. In that case, the lithium depleted stream takes place of the lithium extract, the reject stream takes place of the lithium concentrate and the fresh water stream corresponds to the permeate stream.

An eluent stream 112 is contacted with the lithium-loaded medium to release the lithium into the eluent stream 112 to form a lithium extract stream 114 (or eluate). Where the medium is a liquid, a separate lithium unloading vessel (not shown) may be used as part of the extraction stage 102 to contact the loaded medium with the eluent.

The composition and volume of the eluent stream 112, prior to contacting with the loaded medium, may be controlled to achieve a desired composition of the lithium extract stream 114. For example, flow rate of the eluent stream 112 may be controlled to achieve a desired lithium concentration in the lithium extract stream 114. In this way, lithium concentration may be arbitrarily chosen, up to the solubility limit of the lithium salts in the aqueous lithium extract stream 114. Recycle streams from other parts of the process may be included in the eluent stream 112 to target a desired composition of the eluent stream 112, for example to minimize impurities or to target a lithium composition of the eluent stream 112.

The lithium extract stream 114 is provided to the concentration stage 104 to separate water from the lithium, which is typically mostly lithium chloride at this stage. The concentration stage 104 includes operations that selectively separate water from lithium. These operations include membrane operations and selective filtration operations. In one embodiment, a series of membrane separations is performed to separate a brine stream with high lithium concentration, as a non-permeating stream, from a brine stream with low lithium concentration, as a permeating stream. The concentration stage 104 yields a lithium concentrate stream 116, which may have a solution lithium concentration of over 12% lithium chloride, preferably over 20% lithium chloride, ie over about 2 wt % lithium, preferably 3.3 wt % lithium, up to saturation. Impurities that might impede the concentration processes of the concentration stage 104, such as divalent ions in the case of membrane operations, may be removed from the lithium extract stream 114 prior to concentration in the concentration stage 104.

The concentration stage 104 also produces a dilute brine stream 115 that can be recycled to the extraction stage for use as eluent or recycled to the brine source stream 108, or to any operation in the process that requires a dilute brine source. The dilute brine stream 115 may be the membrane permeating stream and/or material used to perform membrane sweep operations to remove any solids buildup on the membranes.

Figure 5:
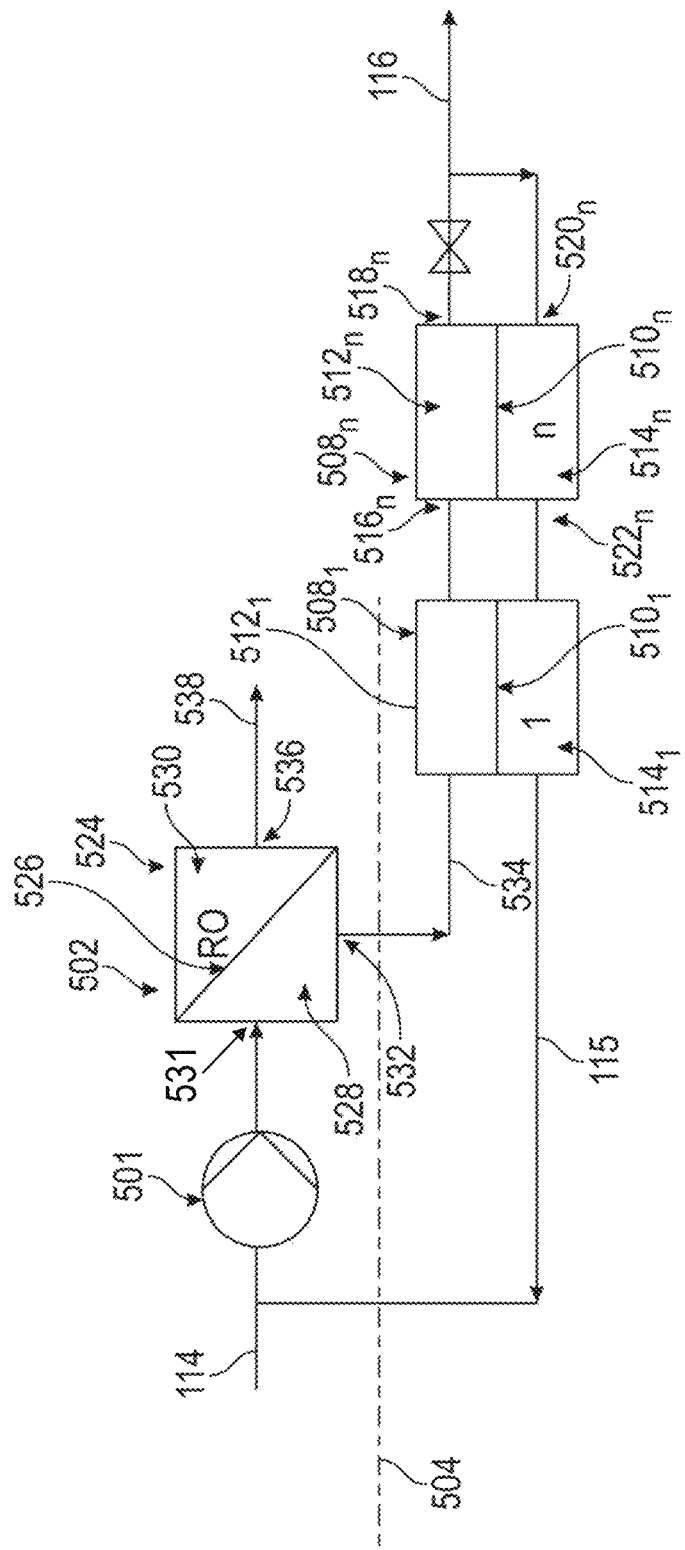
FIG. 5 is a process diagram summarizing a concentration stage of a lithium recovery process according to an embodiment.

An embodiment of the concentration stage 104 is described in relationship with FIG. 5. The concentration stage includes two different membrane separation operations in series: a reverse osmosis operation 502 and a counter-flow reverse osmosis operation 504. In this embodiment, the reverse osmosis operation 502 is upstream from the counter-flow reverse osmosis operation 504 Before the membrane separation operations, the lithium extract stream 114 is pressurized to a target pressure (lower than membrane threshold pressure, and preferably less than or equal to 2000 psi) using a pump 501 before flowing to the membrane separations operations.

The counter-flow reverse osmosis operation uses a plurality of n reactors in series $508_1$- . . . -$508_n$ each comprising a semi-permeable membrane $510_1$- . . . -$510_n$, optionally a lithium selective membrane. The semi-permeable membrane may be a reverse osmosis membrane, a nanofiltration membrane or more generally any type of membrane that enables water molecules to go through while lithium ions do not go through. The reactors may all comprise the same type of membranes or different reactors may have a different type of membranes. Each membrane $510_1$- . . . -$510_n$ separates each reactor into a first volume $512_1$- . . . -$512_n$ to receive a stream to be concentrated or non-permeating stream, here a stream derived from the lithium extract stream 114 and a second volume $514_1$- . . . -$514_n$ to receive a permeating stream. Each reactor comprises a first inlet $516_1$- . . . -$516_n$ to receive the stream to be concentrated (or non-permeating stream) and a first outlet $518_1$- . . . -$518_n$ to exit the concentrated stream from the reactor. Each reactor also comprises a second inlet $520_1$- . . . -$520_n$ to receive the permeating stream and a second outlet $522_1$-....-$522_n$ to exit the permeating stream from the reactor (for clarification purposes only the inlets $516_n$, $520_n$ and outlets $518_n$ and $522_n$ are shown on the FIG. 5). The non-permeating stream 534 derived from the lithium extract stream 114 and permeating stream flow counter-current, ie the non-permeating stream flows from reactor 1 to n while the permeating stream flows from reactor n to 1. The non-permeating stream is collected at the first outlet $518_n$ of the nth reactor $508_n$ and forms the lithium concentrate stream 116. The permeating stream is collected at the second outlet $522_n$ of the first reactor and forms the dilute brine stream 115 may be recycled into the counter-flow reverse osmosis operation and/or recycled to one or more other stages of the process, for instance as a strip solution or as an eluent in the extraction stage. The number of stages n may be between 2 and 10, optionally between 3 and 6 to limit the costs while concentrating the stream to a target concentration. The concentration stage may also include a plurality of counterflow reverse osmosis operation 504 in parallel, each handling a portion of the flow to be concentrated.

Figure 6:
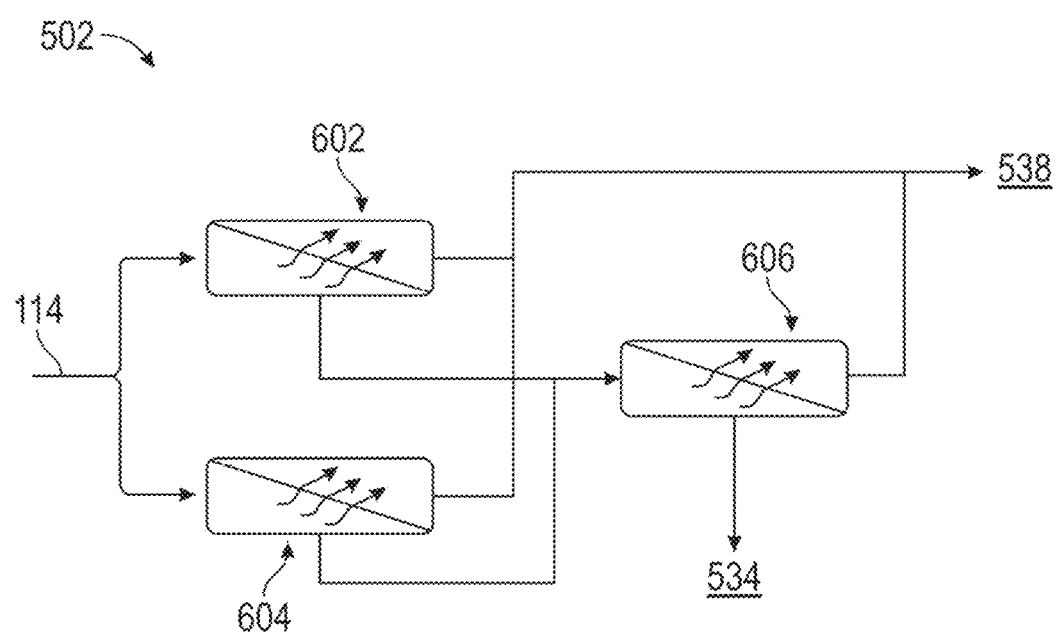
FIG. 6 is a process diagram of a portion of a concentration stage of a lithium recovery process according to another embodiment.

The reverse osmosis operation 502 is represented as including a RO container 524 also including a semi-permeable membrane 526, optionally a lithium selective membrane. The semi-permeable membrane may be a reverse osmosis membrane, a nanofiltration membrane or more generally any type of membrane that enables water molecules to go through while lithium ions do not go through. The membrane 526 separates the RO container into a first volume 528 to receive a stream to be concentrated, here the lithium extract stream 114 and a second volume 530. The lithium extract stream 114 enters the RO container via an inlet 531 situated in the first volume and the container comprises a first outlet 532 in the first volume through which a preconcentrated stream 534 containing a higher concentration of lithium than the lithium extract stream 114 exits the RO container and a second outlet 536 in the second volume through which the stream 538 with a lower concentration of lithium that passed through the membrane (ie permeate stream) exits the RO container. The reverse osmosis operation 502 is represented in one stage with one container but it can also be in several stages, including a plurality of containers with identical or different semi-permeable membranes therein in series, ie the preconcentrated stream 534 exiting a first RO container is directed to the inlet of a second RO container to further concentrate the preconcentrated stream before counter-flow reverse osmosis operation, and/or the permeate 538 is directed to the inlet of an additional RO to container to desalinate the brine. The reverse osmosis operation may also include several RO containers in parallel. Another configuration for the reverse osmosis operation 502 with a first stage having two RO containers 602, 604 in parallel and a second stage having a RO container 606 in series and receiving the concentrated stream of both RO containers as an input for further concentration is represented as an example in FIG. 6. Using RO containers in series during reverse osmosis operation 502 can reduce the number of stages of the counter-flow reverse osmosis operation 504 as well as maximize permeate recovery, that can be re-used into the process as explained above, therefore reducing fresh water demand. Indeed, the permeate of each container in this case may be recycled to one or more stages of the process, in particular as eluent 112 of the lithium extraction stage 102.

In the embodiment shown on FIG. 5, the concentration stage first comprises the reverse osmosis operation 502. The preconcentrated stream 534 is then directed to the counter-flow reverse osmosis operation 504, while the permeate stream 538 that has a low TDS (less than 2,000 mg/l, preferably less than 500 mg/l and preferably around 100 mg/l) is recycled to another stage of the process, for instance in the extraction stage 102 as eluent, or any other stream used in the method where fresh water is needed. During the counter-flow reverse osmosis operation 504, the preconcentrated stream 534 passes through the n reactors $508_1$-....-$508_n$ and is collected at the exit of the $n^{th}$ reactor $508_n$. The counter-flow reverse osmosis output stream is depressurized and separated into a first portion that forms the lithium concentrate stream 116 and a second portion that is sent back to the reactors $508_1$-....-$508_n$ as a permeating stream. Using a lithium concentrate portion as a permeating stream in counter-flow reverse osmosis 504 increases operation efficiency. The depressurization may enable to recover energy by converting the pressure into energy, using for instance a generator associated to a turbine. In each reactor, the lithium concentration of the preconcentrated stream 534 increases while the lithium concentration of the dilute brine stream decreases. The dilute brine stream 115 may be recycled to the concentration stage 104, ie mixed with the lithium extract stream 114 to be further concentrated. In another embodiment, the concentration stage 104 may include only the counter-flow reverse osmosis operation 504 and no reverse osmosis operation 502 depending on lithium extract 114 concentration and target concentration of lithium concentrate 116. In that case, a portion or all of the dilute brine stream may be recycled to another stage of the process.

Such a concentration stage including counter-flow reverse osmosis operation 504 enables a concentration ratio between the stream exiting the $n^{th}$ reactor and the stream entering the first reactor, of 2 to 20. The concentration of the dilute brine 115 may be reduced so that a concentration ratio between the stream exiting the first reactor and the stream entering the $n^{th}$ reactor, of 2 to 20, The stream entering the counter-flow reverse osmosis operation 504 has preferably a lithium concentration between 0.05% and 6% weight, preferably between 0.5 and 3%. The lithium concentrate stream 116 at the exit of the counter-flow reverse osmosis operation 504 has a TDS (total dissolved solids) over 120,000 mg/l preferably over 200,000 mg/l and a lithium concentration over 2%, preferably over 3.3% and the dilute brine 115 at the exit of the counter-flow reverse osmosis operation 504 has preferably a lithium concentration of less than 2% weight, preferably less than 1.5% weight. The counter-flow reverse osmosis operation 504 enables to increase the lithium concentration in the lithium concentrate 116 compared to a more conventional method such as simple reverse osmosis operation in an order of magnitude of about 3 to 4, enabling to recover more than 80%, preferably more than 90% of the lithium extract 114 as the dilute brine stream 115. The counter-flow reverse osmosis is an example of a second membrane separation operation that enables to go up to a TDS over 120,000 mg/l. However, a second membrane separation operation having different configuration and setup may enable to reach such concentration, using for instance different equipment, or flow pattern, etc. Such operation is also covered by the current disclosure.

Combining a reverse osmosis operation 502 and a counter-flow reverse osmosis operation 504 limits the cost necessary for the concentration stage by limiting the number of reactors in the counter-flow reverse osmosis operation. Furthermore, combining those operations enables to generate a permeate of the reverse osmosis operation 502 that can be recycled into an eluent 112 in the lithium extraction operation, significantly limiting the fresh water needed in the extraction operation (fresh water being mainly used as eluent 112). Indeed, the permeate stream has a low lithium concentration and low TDS and is an efficient eluent whereas the dilute brine stream 115 may have a higher TDS that may not directly enable to extract lithium efficiently from the extraction stage.

In an embodiment, the dilute brine stream may be treated using a specific reverse osmosis operation independently from the lithium concentration stage (downstream of the counter-flow reverse osmosis operation)—the reverse osmosis 502 being then optional. Any configuration or variation that enables to concentrate lithium up to a certain concentration and obtain fresh water (ie stream with TDS below 2,000 mg/l) that can be recycled elsewhere is part of the disclosure.

In another embodiment, the dilute brine stream 115 may however be recycled into an eluent 112 by being mixed with an additional stream, for instance a fresh water stream and/or by undergoing an impurity removal operation before being recycled into eluent.

The lithium concentrate stream 116 is provided to the conversion stage 106. The conversion stage 106 is energy intensive, so a concentration operation is performed prior to conversion of the lithium. In this embodiment, a vaporizer 118 is used to further concentrate the lithium salt in the lithium concentrate stream 116 from a low level, such as 4 wt % LiCl, to a higher level, such as about 15 wt % LiCl, prior to conversion. However, in other embodiments, no vaporizer is needed especially when the concentration stage includes the embodiment disclosed in relationship with FIG. 5. The vaporizer 118 yields a vaporizer water stream 120, which can be recycled to the concentration stage 104, as a dilution, sweep, or thermal integration stream, or to the extraction stage 102 as eluent or feed dilution. The vaporizer 118 also yields an impurity stream 122, which contains non-lithium cations such as sodium, potassium, magnesium, manganese, calcium, and the like. The vaporizer 118 also yields a lithium pre-conversion stream 124, which can have lithium concentration of 15 wt % or more, and which is provided to a first conversion operation 126.

The first conversion operation 126 uses a sodium carbonate stream 127 to convert lithium chloride to a first conversion stream 128 that exits the first conversion operation 126 as a slurry of lithium carbonate in water. Water that enters the first conversion operation 126 with the lithium pre-conversion stream 124 and the sodium carbonate stream 127 has reacted and becomes a first conversion recycle stream 129 (that is mainly sodium chloride) that is at least partially removed. The first conversion recycle stream 129 can be recycled to the vaporizer 118, to the concentration stage 104, or to the extraction stage 102 as feed or eluent.

The first conversion stream 128 is provided to a second conversion operation 130 to convert the lithium carbonate into lithium hydroxide. A calcium hydroxide stream 131 is provided to the second conversion operation 130 to convert the lithium carbonate of the first conversion stream 128 into lithium hydroxide, which exits the second conversion operation 130 as a lithium hydroxide stream 132, which may be a slurry, paste, or dry solid. The lithium hydroxide stream 132 is a product stream of the process 100. Water entering the second conversion operation 130 with the first conversion stream 128 and the calcium hydroxide stream 131 is at least partially removed in a second conversion recycle stream 133, which can be recycled to the vaporizer 118, the concentration stage 104, or the extraction stage 102 as feed diluent or as eluent.

The various water recycle streams form a water circuit 150 that is used to optimize use of water in the process 100, potentially along with energy use and removal of impurities. Reagent streams 127 and 131 are input to the process 100, along with any other reagent streams for optional impurity removal processes. Any impurities that enter the process 100 in the reagent streams are generally captured in the water circuit 150 and recycled to upstream processes, effectively counterflowing impurities to the extraction stage 102 for removal in the lithium depleted brine stream 110. Water handling can be optimized to minimize use of a water makeup 140 at the eluent 112 of the extraction stage 102.

Streams containing lithium and/or impurities can also be recycled. As shown in FIG. 1, some or all of the lithium pre-conversion stream 124 can be recycled to the vaporizer 118, the concentration stage 104, the extraction stage 102, or to the brine source stream 108. Likewise, some or all of the first conversion stream 128 can be recycled to the vaporizer 118, the concentration stage 104, the extraction stage 102, or to the brine source stream 108. The various anions that are introduced in later stages of the process 100, such as carbonate and hydroxide, can be managed by adjusting addition of carbonate and hydroxide reagents depending on residual carbonate and hydroxide content of various streams in the process, which can be ascertained by any convenient analytical method, including use of in-line instruments (e.g. spectroscopy instruments and titrators).

Figure 2:
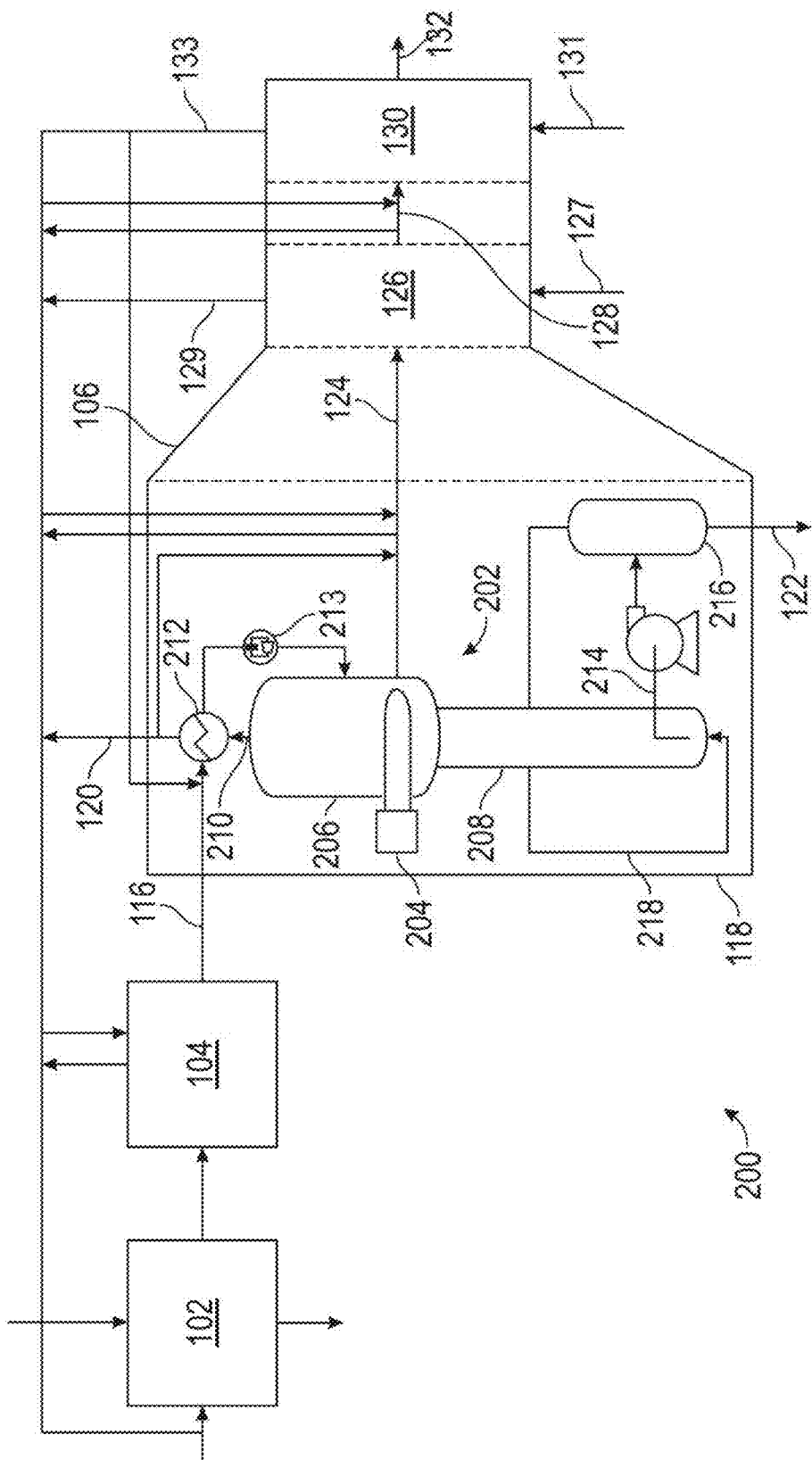
FIG. 2 is a process diagram summarizing a lithium recovery process according to another embodiment.

FIG. 2 is a process diagram summarizing a lithium recovery process 200 according to another embodiment. The process 200 is similar in many respects to the process 100, and identical features of the processes 100 and 200 are labeled using the same reference numerals. A vaporization vessel 202 receives the lithium concentrate stream 116. Heat is applied to the lithium concentrate stream 116 within the vaporization vessel 202 to vaporize water and concentrate lithium and other ions within the vessel 202. A heater 204 is coupled to the vessel 202 to apply heat to the fluid within the vessel 202. The heater 204 is shown here schematically as an element inserted into the interior of the vessel 202, but heat input can be accomplished in any convenient manner.

The vessel 202 generally has a vaporization section 206 and a precipitation section 208. Solids precipitate from the fluid as water is vaporized and solubility limits are reached. The vaporizer 118 is therefore also a precipitator of solids. Sodium precipitate as chloride, and potentially other salts due to trace amounts of other anions. Lithium generally remains in a concentrated solution, but some lithium salts can precipitate if enough water is removed by evaporation. Sodium solids generally settle below the lithium-rich solution due to density. The lithium solution is removed as the lithium pre-conversion stream 124, which is removed from a lower part of the vaporization section 206. Vaporized water is removed in an overhead stream 210 of the vaporization section 206. Heat is recovered from the vaporized water by thermally contacting the vaporized water with the lithium concentrate stream 116 in a heat exchanger 212. The heated lithium concentrate stream 116 is provided to the vaporization section 206 of the vessel 202, optionally using a valve or orifice to flash the heated lithium concentrate stream 116 within the vaporization section 206. The vaporized water is at least partially condensed in the heat exchanger 212, and a portion of the vaporized water is added to the lithium pre-conversion stream 124 to ensure all the lithium in the lithium pre-conversion stream 124 is dissolved for the next conversion process. The remaining vaporized water exits as the vaporizer water stream 120. Additional heat can be added to the lithium concentrate stream 116 using an optional heat pump 213 located downstream of the heat exchange 212 to maximize recovery of thermal energy from the overhead stream 210.

Sodium solids, mainly chloride, along with other impurities such as calcium, potassium, magnesium, and manganese, also including any anion impurities, also precipitate in the vaporization section 206 of the vessel 202, and due to higher density than the concentrated lithium solution settle into the precipitation section 208. Note that the vaporization section 206 of the vessel 202 is sized to provide residence time for sodium precipitates to settle into the precipitation section 208. A precipitate stream 214 is withdrawn from a lower portion of the precipitation section 208 and pumped to a settling vessel 216. The sodium solids, along with other dense impurities, settle in the settling vessel 216 and are removed as the impurity stream 122. Separated water or brine is withdrawn from the settling vessel 216 and returned to the vaporization vessel 202 as a vaporization return stream 218. In this case, the water or brine is returned at the bottom of the precipitation section 208 to fluidize solids that may collect at the bottom of the precipitation section 208. The water or brine, or a portion thereof, can be returned to the vaporization vessel 202 at other points, or may be routed to other uses.

Where convenient, various downstream water and brine streams containing lithium, and potentially impurities, can be recycled, in part or in total, to the vaporizer 118 to blend with the lithium concentrate stream 116 upstream of the heat exchanger 212. These streams include the pre-conversion stream 124, the first conversion stream 128, the first conversion recycle stream 129, and the second conversion recycle stream 133. These streams can be mixed and recycled to any convenient extent to manage the lithium content and volume of the stream provided to the vaporization section 206 of the vaporizer 118. For example, a level instrument can sense a liquid level in the vaporization section 206, and a controller operatively coupled to the level instrument can control volume of recycle from these downstream streams to the vaporizer 118 to maintain the liquid level in the vaporization section 206 without impacting overall lithium throughput of the process 200 (i.e. flow rate of the lithium concentrate stream 116).

The vaporizer 118 can be used to concentrate any lithium stream having any input concentration of lithium. For example, the vaporizer 118 could be used to directly concentrate lithium from the brine source stream 108, without use of the extraction stage 102 and the concentration stage 104. A portion of the brine source stream 108 could also be routed directly to the vaporizer 118, bypassing the extraction stage 102 and the concentration stage 104, for example to optimize capacity utilization of the various operations. Impurities in the brine source stream 108 would be directly precipitated by rising concentration in the vaporizer 118, and would be removed in the settling vessel 216.

Figure 3:
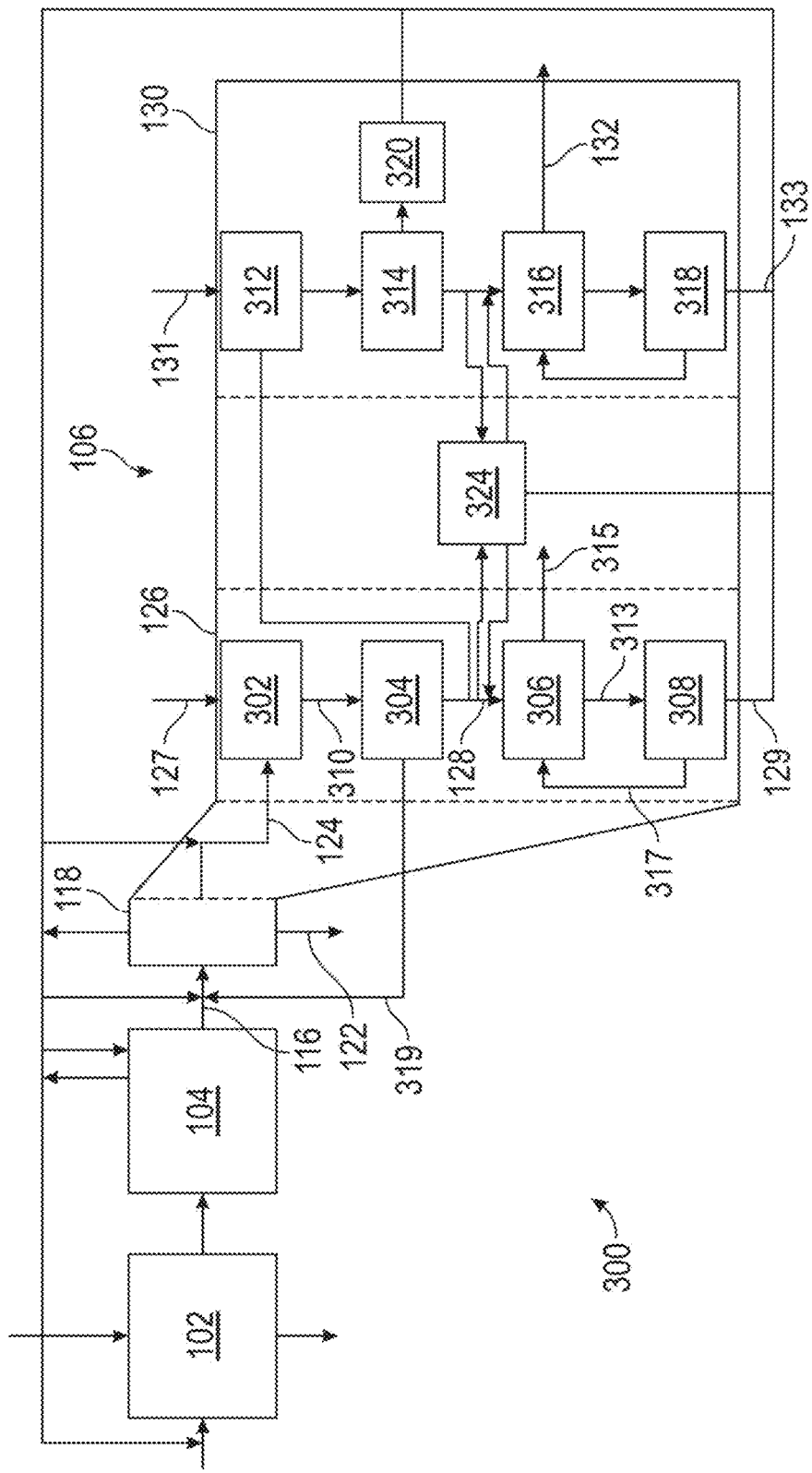
FIG. 3 is a process diagram of a lithium recovery process according to another embodiment.

FIG. 3 is a process diagram summarizing a lithium recovery process 300 according to another embodiment. The process 300 is similar in many respects to the processes 100 and 200, and features of the process 300 that are identical to features of the processes 100 and 200 are labeled using the same reference numerals. Details of the conversion processes 126 and 130 are shown in FIG. 3. The conversion processes 126 and 130 are similar. Both processes include a mixing and reaction process, a rotary separation process, a drying process, and a water recovery process. The first conversion operation 126 uses a mixing vessel 302, a rotary separator 304, a dryer 306, and a condenser 308. The second conversion operation 130 also uses a mixing vessel 312, a rotary separator 314, a dryer 316, and a condenser 318, but also uses a filtration unit 320. One or more concentration stages 104 can also be included in the conversion stage 106 to reduce energy consumption of the dryers 306 and 316.

The pre-conversion stream 124, containing up to 15 wt % lithium salt (typically as mostly lithium chloride) in solution, is provided to the mixing vessel 302. The sodium carbonate stream 127 is also provided to the mixing vessel 302 where the two streams are mixed and allowed to react. Lithium carbonate precipitates. The extent of lithium carbonate removal as precipitate depends on the amount of sodium carbonate added to the reaction and on the temperature of the medium. Lithium carbonate precipitation, and conversion from lithium chloride, can be encouraged by operating the mixing vessel at elevated temperature, for example 80° C. to 90° C. Thermal tools, such as heaters and the like (not shown), can be used to target temperatures of streams as desired.

A reaction mixture 310 is passed from the mixing vessel 302 to the rotary separator 304, which may be a centrifuge or hydrocyclone. Rotary separation results in separation of materials according to density, such that a stream rich in lithium carbonate can be separated from the remaining liquor as the first conversion stream 128. The remaining liquor may contain sodium carbonate, sodium chloride, lithium chloride, and lithium carbonate. To maximize separation in the rotary separator 304, the contents of the rotary separator 304 are maintained at an elevated temperature to maximize lithium carbonate solids. To maximize lithium recovery, the separated liquor can be recycled, as a conversion recycle stream 319, to the vaporizer 118. In this case, the conversion recycle stream 319 is mixed with the lithium concentrate stream 116 prior to entering the vaporizer 118, but the conversion recycle stream 319 can be provided to the vaporizer 118 in any convenient manner. For example, the conversion recycle stream 319 can be mixed with the lithium concentrate stream 116, and the mixed stream flowed through the heat exchanger 212 (FIG. 2) into the vaporization section 206. Alternately, the conversion recycle stream 319 can be provided directly to the vaporization section 206, or to the precipitation section 208, preferably near the location where the vaporization section 206 and the precipitation section 208 join.

If desired, a lithium carbonate product may be recovered in the first conversion operation 126. All, or a portion, of the first conversion stream 128 may be provided to the dryer 306 where a gas stream 317 is used to remove moisture and form a lithium carbonate product 315, which may be a paste or powder. The gas can be air, nitrogen, or other gas, or mixture thereof, that is non-reactive with lithium carbonate. A moist gas stream 313 is routed to the condenser 308 to condense a water stream that exits as the first conversion recycle stream 129. The dried gas is recycled to the dryer 306 as the gas stream 317. The dryer 306 can be used to recover water added to the process in the sodium carbonate reagent stream 127. In such cases, recovery of a lithium carbonate product might not be desired, so the lithium carbonate can be concentrated to any desired extent and the lithium carbonate stream 315, not a product in this case but an intermediate material, can be recycled or rejoined with the first conversion stream 128.

The second conversion operation 130 is similar to the first conversion process 126. The first conversion stream 128, containing lithium carbonate, is provided to the mixing vessel 312. The calcium hydroxide stream 131 is also provided to the mixing vessel 312, reacting with the lithium carbonate to precipitate calcium carbonate. In this case, elevated temperature, for example 80° C. to 90° C., encourages reaction, but also encourages lithium hydroxide to remain in solution. The reaction medium is provided to the rotary separator 314, where calcium carbonate is separated from the lithium hydroxide solution. The separated calcium carbonate is provided, as a slurry, to the filtration unit 320 for packing into a solid manageable form. Recovered water can be recycled from the filtration unit 320 to any convenient part of the process 300.

The lithium hydroxide solution is provided to the dryer 316, which evaporates water and precipitates the lithium hydroxide product 132 as a powder or paste. The lithium hydroxide solution is exposed to a dry gas stream to remove water. In this case, the gas does not contain carbon dioxide, in order to avoid converting any lithium hydroxide to lithium carbonate. Nitrogen, carbon-free air, or other suitably non-reactive gas or gas mixture can be used. Water is recovered from the moist gas of the dryer in the condenser 318, and water from the condenser 318 exits as the second conversion recycle stream 133, which can be combined with the first conversion recycle stream 129, if desired, and routed to any convenient part of the process 300 as recycle. The humidification-dehumidification processes described herein to remove water from lithium carbonate and lithium hydroxide solutions/slurries can be practiced using the CGE humidification-dehumidification process available from Gradient Corp., of Chennai, India.

The dryers 306 and 316 consume energy to evaporate water. To reduce the amount of water to be evaporated, a concentration stage 324 can be used to concentrate the lithium streams recovered in the rotary separators 304 and 314. One concentration stage 324, or two concentration stages 324, can be used, and water recovered in one or both concentration stages 324 can be recycled to any convenient location of the process 300. These concentration stages 324 can be similar, or the same as the concentration stage 104 used further upstream in the process 300. Specifically, each concentration stage 324 can be a membrane separation process, which can use a plurality of membrane separations in series and/or parallel arrangements, which can be selected according to the separation needs of specific processes. The plurality of membrane separations in a given process can be operated in co-current format, where permeate and non-permeate streams generally flow from one membrane to the next together, counter-current format, where permeate and non-permeate streams generally flow from membrane to membrane in opposite sequential orientations, or a mixture thereof. In general, the concentration stage 324 would receive a lithium bearing stream from the rotary separator, 304 and/or 314, separate a purified lithium bearing stream by separating water into a permeate stream, and might return the lithium bearing stream to the dryer, 306 and/or 316, with the separated dilute stream being available for recycling. The lithium bearing stream can also be routed to the extraction stage 102, the vaporizer 118, and/or to the mixing vessel 302. Impurity levels in the lithium bearing streams may determine recycle route of the lithium bearing stream from the concentration stage 324 in the process 300.

Figure 4A:
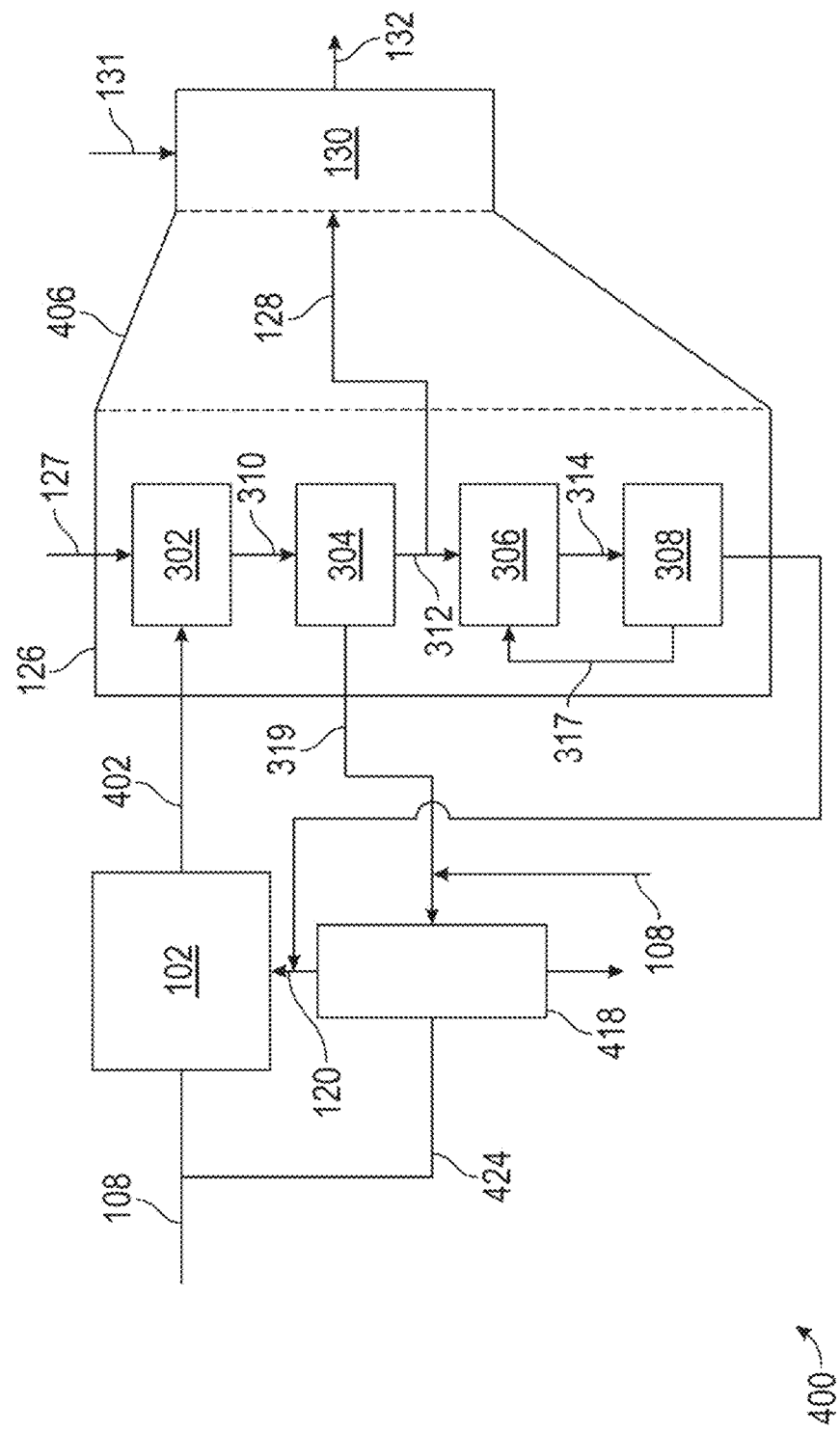
FIGS. 4A and 4B are process diagrams summarizing lithium recovery processes according to other embodiments.

FIG. 4A is a process diagram summarizing a lithium recovery process 400, according to another embodiment. In the process 400, a vaporizer 418 is used to separate water from the conversion recycle stream 319 and to yield a lithium recycle stream 424, which is routed to the extraction stage 102. In this case, the extraction stage 102 produces a lithium extract 402 that is routed directly to the first conversion operation 126 of a conversion stage 406, which comprises the first conversion process 126 and the second conversion process 130. In the process 400, no concentration stage is used because the vaporizer 418 performs the impurity removal that would ordinarily result from the concentration stage. Because the extraction stage 102 can yield a lithium extract 402 with arbitrary lithium concentration, the concentration stage is not used. Water separated in the dryer 306 is returned to the extraction stage 102 as eluent, along with water vaporized in the vaporizer 418. Here, the brine source stream 108 can be provided to the vaporizer 418, in addition to or instead of directly to the extraction stage 102.

Figure 4B:
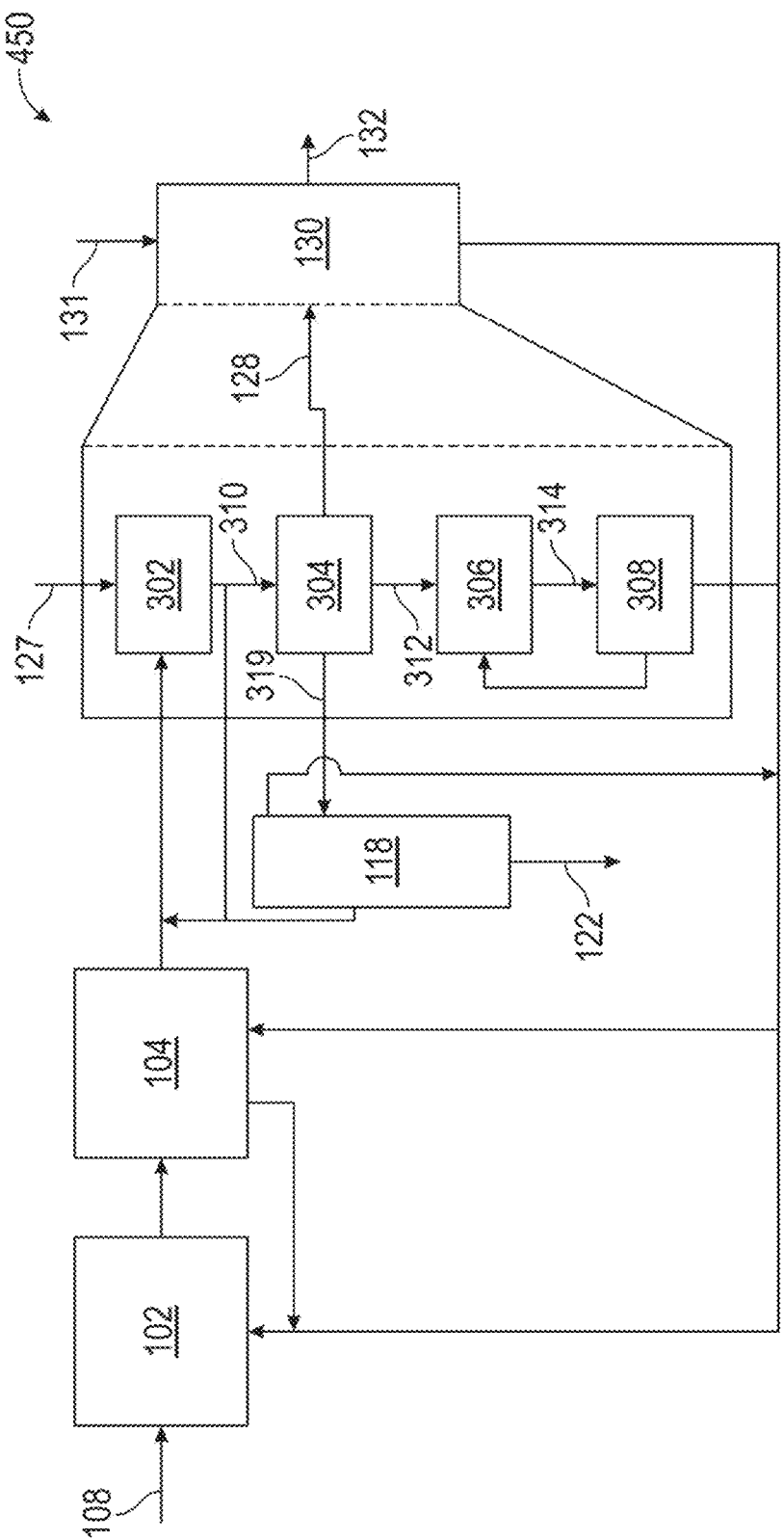

FIG. 4B is a process diagram summarizing a lithium recovery process 450, according to another embodiment. The process 450 is similar to the process 300, except that in the process 450, the vaporizer 118 is used to recover lithium not forwarded in the first conversion stream 128. The conversion recycle stream 319 is provided to the vaporizer 118, and lithium is returned to the rotary separator 304 or to the mixing vessel 302 for further recovery.

The processes 400 and 450 illustrate alternative uses of a vaporizer in various lithium recovery roles. It should be noted that multiple such vaporizers could be used in more than one of the roles described herein. That is to say, a lithium recovery process, as contemplated herein, could have a vaporizer used as a pre-conversion concentrator/purifier, as shown in FIGS. 1-3. The same process could additionally have a vaporizer used as a feed purifier and/or a conversion recycle purifier, as shown in FIG. 4A. The same process could additionally have a vaporizer used only as a conversion purifier, as shown in FIG. 4B. It should also be noted that in the processes 400 and 450, membrane concentrators can be used instead of, or in addition to, vaporization concentrators. That is to say, the vaporizer 418 in FIG. 4A could be a membrane concentration stage, or a combination membrane/vaporizer concentration stage. The vaporizer 118 in FIG. 4B could be replaced by a membrane concentration stage or by a combination membrane/vaporizer concentration stage.

Finally, it should also be noted that the first and second conversion processes, in their various implementations described herein, can be used independent of any extraction processes or concentration processes, and independent of each other or in any order. For example, a lithium salt stream can be provided to the first conversion process and can be converted to lithium carbonate as a stand-alone process. Likewise, a lithium carbonate stream can be provided to the second conversion process and can be converted to lithium hydroxide as a stand-alone process. Finally, it should be noted that the vaporization concentration processes described herein are not required for recovering lithium. Such vaporization processes may be helpful in recovering lithium in some cases, but as noted elsewhere herein, membrane concentration can generally be substituted for vaporization in most cases, and lithium recovery processes can be operated entirely without using the vaporizers described herein.

While the foregoing is directed to embodiments of the present invention, other and further embodiments of the present disclosure may be devised without departing from the basic scope thereof, and the scope thereof is determined by the claims that follow.

The disclosure relates to a method of recovering lithium from a brine source. The method comprises extracting lithium from the brine source using an ion withdrawal process to form a lithium extract; and concentrating a non-permeating stream derived from the lithium extract to form a lithium concentrate using at least a membrane separation operation. The membrane separation operation includes flowing the non-permeating stream in a plurality of reactors, wherein each reactor contains a semi-permeable membrane separating the reactor into a first and a second volumes, wherein the non-permeating stream flows sequentially into the first volume of the plurality of reactors, collecting the non-permeating stream at the outlet of the plurality of the reactors, wherein a first portion of the non-permeating stream forms the lithium concentrate and a second portion of the non-permeating stream is recycled into the membrane separation operation as a permeating stream, and flowing the permeating stream sequentially into the second volume of the plurality of reactors counter-current to the non-permeating stream.

In an embodiment, the membrane separation operation is a first membrane separation operation, and the method includes a second membrane separation operation to concentrate an inlet stream derived from the lithium extract upstream from the first membrane separation operation. The second membrane separation operation includes separating the inlet stream into a preconcentrated stream and a permeate stream using at least a semi-permeable membrane. The preconcentrated stream is the non-permeating stream of the first membrane separation operation. In such embodiment, at least a portion of the permeate stream may be recycled, ie directed to any operation of the method, especially having a fresh water need, for instance in the ion withdrawal process. More than 80%, preferably more than 90% of the lithium extract may be recycled into the ion withdrawal process.

In an embodiment, extracting lithium from the brine source includes contacting a brine source stream with a lithium selective medium to load the medium with lithium and contacting an eluent stream with the lithium-loaded medium to form the lithium extract. The permeate stream may then be recycled into the eluent stream.

The method may also include collecting the permeating stream at the outlet of the plurality of the reactors. The collected stream forms a dilute brine stream. At least a portion of the dilute brine stream may be recycled into the at least one membrane separation operation. At least a portion of the dilute brine stream may be recycled into the ion withdrawal process, optionally as the eluent stream or as a strip solution. At least a portion of the dilute brine stream may be mixed with an additional stream, and the mixed stream may be recycled into the eluent stream. The method may also include treating impurities of the dilute brine stream using an impurity removal process before recycling it into the ion withdrawal process.

The method may include pressurizing the non-permeating stream before flowing it into the first volume of the plurality of reactors and depressurizing the permeating stream before flowing it into the second volume of the plurality of reactors, for instance at a target pressure below 2000 psi. In such embodiment, the method may also include recovering energy in the depressurizing operation by converting the pressure into energy. In a particular embodiment, the method includes pressurizing the inlet stream before the second membrane separation operation.

The plurality of reactors may include 2 to 10, preferable 3 to 6, reactors. The lithium concentration range between the lithium concentrate and non-permeating stream may be between 2 and 20. The lithium concentration range between the lithium concentrate and dilute brine stream may be between 2 and 20. The TDS of the lithium concentration is over 120,000 mg/l and preferably over 200,000 mg/l. The lithium concentration of the lithium concentrate may be over 2.%, preferably over 3.3% weight.

In an embodiment the ion withdrawal process is a continuous counter-current adsorption desorption process.

The method may also comprise converting the lithium concentrate during a conversion stage. Lithium chloride from the lithium concentrate stream may be converted to lithium carbonate and/or hydroxide.

The disclosure also relates to a method of recovering lithium from a brine source, comprising extracting lithium from the brine source using an ion withdrawal process to form a lithium extract; concentrating the lithium extract using a first membrane separation operation, having a first semi-permeable membrane to yield a preconcentrated stream and a permeate stream, and concentrating the preconcentrated stream using a second membrane separation operation. The preconcentrated stream then flows into a plurality of reactors, each containing a semi-permeable membrane separating the reactor into a first volume and a second volume, wherein the preconcentrated stream flows as a non-permeating stream sequentially into the first volume of each reactor and a permeating stream flows sequentially into the second volume of each reactor counter-current to the preconcentrated stream, wherein the non-permeating stream exiting the plurality of reactors yields a lithium concentrate and the permeating stream exiting the plurality of reactors yields a dilute brine stream.

The permeate stream may be recycled, ie directed to any operation of the method, especially having a fresh water need, for instance in the ion withdrawal process. In particular, more than 80%, preferably more than 90% of the lithium extract is recycled.

Extracting lithium from the brine source may include contacting a brine source stream with a lithium selective medium to load the medium with lithium and contacting an eluent stream with the lithium-loaded medium to form the lithium extract. The permeate stream may recycled into the eluent stream.

The dilute brine stream may be recycled into the first membrane separation operation.

A portion of the non-permeating stream exiting the plurality of reactors may be recycled into the permeating stream.

The concentration includes pressurizing the lithium extract and/or the preconcentrated stream. In an embodiment, it may be pressurized before first membrane separation operation, preferably at a target pressure lower than membrane threshold pressure, in particular below 2000 psi. The non-permeating stream may be depressurized after exiting the plurality of reactors. A portion of the depressurized non-permeating stream may be recycled into the permeating stream. The method may include recovering energy from pressure at depressurization of the non-permeating stream.

The plurality of reactors may include 2 to 10, preferable 3 to 6, reactors. The lithium concentration range between the lithium concentrate and non-permeating stream may be between 2 and 20. The lithium concentration range between the lithium concentrate and dilute brine stream may be between 2 and 20. The TDS of the lithium concentration is over 120,000 mg/l and preferably over 200,000 mg/l. The lithium concentration of the lithium concentrate may be over 2.%, preferably over 3.3% weight.

In an embodiment the ion withdrawal process is a continuous counter-current adsorption desorption process.

The method may also comprise converting the lithium concentrate during a conversion stage. Lithium chloride from the lithium concentrate stream may be converted to lithium carbonate and/or hydroxide.

The disclosure also relates to a method of recovering lithium from a brine source, comprising extracting lithium from the brine source using an ion withdrawal process to form a lithium extract; concentrating the lithium extract using a reverse osmosis operation, to yield a preconcentrated stream and a permeate stream, concentrating the preconcentrated rated stream using a counter-flow reverse osmosis operation, to yield a lithium concentrate and a dilute brine stream, recycling the dilute brine stream into the reverse osmosis operation, and recycling the permeate stream, ie directing it to any operation of the method, especially having a fresh water need, such as in the ion withdrawal process.

Concentrating the lithium extract may include pressurizing the lithium extract, optionally before the reverse osmosis operation, for instance at a target pressure lower than membrane threshold pressure, in particular below 2000 psi.

The counter-flow reverse osmosis operation may include flowing the preconcentrated stream into a plurality of reactors in series, each containing a semi-permeable membrane separating the reactor into a first volume and a second volume, wherein the preconcentrated stream flows as a non-permeating stream sequentially into the first volume of each reactor and a permeating stream flows sequentially into the second volume of each reactor counter-current to the preconcentrated stream, wherein the non-permeating stream exiting the plurality of reactors yields the lithium concentrate and the permeating stream exiting the plurality of reactors yields the dilute brine stream. A portion of the non-permeating stream at the exit of the plurality of reactors may be recycled into the permeating stream. The method may also include depressurizing the non-permeating stream before recycling it into the permeating stream.

The plurality of reactors may include 2 to 10, preferable 3 to 6, reactors. The lithium concentration range between the lithium concentrate and non-permeating stream may be between 2 and 20. The lithium concentration range between the lithium concentrate and dilute brine stream may be between 2 and 20. The TDS of the lithium concentration is over 120,000 mg/l and preferably over 200,000 mg/l. The lithium concentration of the lithium concentrate may be over 2.%, preferably over 3.3% weight.

In an embodiment the ion withdrawal process is a continuous counter-current adsorption desorption process.

The method may also comprise converting the lithium concentrate during a conversion stage. Lithium chloride from the lithium concentrate stream may be converted to lithium carbonate and/or hydroxide.

More than 80%, preferably more than 90% of the lithium extract is recycled.

Extracting lithium from the brine source may include contacting a brine source stream with a lithium selective medium to load the medium with lithium and contacting an eluent stream with the lithium-loaded medium to form the lithium extract. The permeate stream may recycled into the eluent stream. Alternatively or additionally, the brine source stream yields a lithium depleted brine stream after having contacting the lithium selective medium, and using at least a membrane separation operation or thermal vaporizer to yield a reject stream and a fresh water stream, wherein the fresh water stream is recycled in another stream. The reject stream may be returned to the environment, ie reinjected in the geological formation.

The disclosure also relates to a method of recovering lithium from a brine source. The method comprises extracting lithium from the brine source using an ion withdrawal process to form a lithium extract; and concentrating the lithium extract using a first membrane separation operation, having a first semi-permeable membrane to yield a preconcentrated stream and a permeate stream. The method also includes concentrating the preconcentrated stream using a second membrane separation operation, wherein the preconcentrated stream flows into a plurality of reactors in series, each containing a semi-permeable membrane separating the reactor into a first volume and a second volume. The preconcentrated stream flows sequentially as a non-permeating stream into the first volume of each reactor, and the non-permeating stream exiting the plurality of reactors yields a lithium concentrate. The second membrane operation yields a dilute brine stream that exits the second volume of at least one of the reactors, and is recycled into the first membrane separation operation.

In an embodiment, the permeate stream is recycled ie directed to any operation of the method, especially having a fresh water need, for instance in the ion withdrawal process. At least 80%, preferably 90%, may be recycled.

In an embodiment, extracting lithium from the brine source includes contacting a brine source stream with a lithium selective medium to load the medium with lithium and contacting an eluent stream with the lithium-loaded medium to form the lithium extract. The permeate stream is recycled into the eluent stream. Alternatively or additionally, the brine source stream yields a lithium depleted brine stream after having contacting the lithium selective medium, and using at least a membrane separation operation or thermal vaporizer to yield a reject stream and a fresh water stream, wherein the fresh water stream is recycled, ie directed to any operation of the method, especially having a fresh water need. The reject stream may be returned to the environment, ie reinjected in the geological formation.

The second membrane separation operation may include a permeating stream that flows sequentially in the second volume of the plurality of reactors, counter-current from the non-permeating stream, and the permeating stream yields the dilute brine stream.

A portion of the non-permeating stream exiting the plurality of reactors is recycled into the permeating stream.

The concentration of the lithium extract and/or the preconcentrated stream includes pressurizing the lithium extract and/or the preconcentrated stream. In an embodiment, it may be pressurized before first membrane separation operation and wherein the non-permeating stream is depressurized after exiting the plurality of reactors. The target pressure is lower than membrane threshold pressure, in particular below 2000 psi.

The plurality of reactors may include 2 to 10, preferable 3 to 6, reactors. The lithium concentration range between the lithium concentrate and non-permeating stream may be between 2 and 20. The lithium concentration range between the lithium concentrate and dilute brine stream may be between 2 and 20. The TDS of the lithium concentration is over 120,000 mg/l and preferably over 200,000 mg/l. The lithium concentration of the lithium concentrate may be over 2.%, preferably over 3.3% weight.

In an embodiment the ion withdrawal process is a continuous counter-current adsorption desorption process.

The method may also comprise converting the lithium concentrate during a conversion stage. Lithium chloride from the lithium concentrate stream may be converted to lithium carbonate and/or hydroxide.

The disclosure also relates to a method of recovering lithium from a brine source. The method comprises extracting lithium from the brine source using an ion withdrawal, such as an adsorption/desorption, process to form a lithium extract; concentrating the lithium extract using a first membrane separation operation, having a first semi-permeable membrane to yield a preconcentrated stream and a permeate stream, and concentrating the preconcentrated stream using a second membrane separation operation, wherein the second membrane operation includes a plurality of reactors in series each having a semi-permeable membrane to yield a lithium concentrate, wherein the second membrane separation operation is configured so that the lithium concentrate has a TDS over 120,000 mg/l, preferably over 200,000 mg/l.

The permeate stream may be recycled, ie directed to any operation of the method especially having a fresh water need, for instance in the ion withdrawal process. In particular, more than 80%, preferably more than 90% of the lithium extract is recycled.

Extracting lithium from the brine source may include contacting a brine source stream with a lithium selective medium to load the medium with lithium and contacting an eluent stream with the lithium-loaded medium to form the lithium extract. The permeate stream may recycled into the eluent stream. Alternatively or additionally, the brine source stream yields a lithium depleted brine stream after having contacting the lithium selective medium, and using at least a membrane separation operation or thermal vaporizer to yield a reject stream and a fresh water stream, wherein the fresh water stream is recycled in another stream. The reject stream may be returned to the environment, ie reinjected in the geological formation.

In an embodiment, the second membrane operation also yield a dilute brine stream, wherein the dilute brine stream is recycled into the first membrane operation.

The second membrane operation may be a counter-flow reverse osmosis operation, having a permeating stream and a non-permeating stream that flow sequentially in the plurality of reactors and counter-current, wherein the preconcentrated stream forms the non-permeating stream and yields the lithium concentrate. The permeating stream may yield a dilute brine stream. A portion of the non-permeating stream exiting the plurality of reactors may be recycled into the non-permeating stream.

Concentrating the lithium extract and/or the preconcentrated stream may include pressurizing the lithium extract and/or the preconcentrated stream, for instance before the first membrane separation operation. The target pressure may be lower than membrane threshold pressure, in particular below 2000 psi.

The plurality of reactors may include 2 to 10, preferable 3 to 6, reactors. The lithium concentration range between the lithium concentrate and non-permeating stream may be between 2 and 20. The lithium concentration range between the lithium concentrate and dilute brine stream may be between 2 and 20. The TDS of the lithium concentration is over 120,000 mg/l and preferably over 200,000 mg/l. The lithium concentration of the lithium concentrate may be over 2.%, preferably over 3.3% weight.

In an embodiment the ion withdrawal process is a continuous counter-current adsorption desorption process.

The method may also comprise converting the lithium concentrate during a conversion stage. Lithium chloride from the lithium concentrate stream may be converted to lithium carbonate and/or hydroxide.

The disclosure also relates to a method of recovering lithium from a brine source, including extracting lithium from the brine source using an ion withdrawal process to form a lithium extract; concentrating a stream derived from the lithium extract using a counter-flow reverse osmosis operation, to yield a lithium concentrate and a dilute brine stream, using a reverse osmosis operation to separate the dilute brine stream into two streams including a permeate stream, and recycling the permeate stream, for instance in the ion withdrawal process. Recycling the permeate stream means directing it to any operation of the method especially having a fresh water need.

In particular, more than 80%, preferably more than 90% of the lithium extract is recycled.

In an embodiment, the method includes concentrating the lithium extract using a reverse osmosis operation, to yield a preconcentrated stream and a second stream, concentrating the preconcentrated stream using the counter-flow reverse osmosis operation, to yield the lithium concentrate and the dilute brine stream, and providing the dilute brine stream to the reverse osmosis operation, wherein the second stream of the reverse osmosis operation forms the permeate stream.

Concentrating a stream derived from the lithium extract may include pressurizing the lithium extract, for instance before the counter-flow reverse osmosis operation. The pressurization may be performed at a target pressure lower than membrane threshold pressure, in particular below 2000 psi.

In an embodiment, the counter-flow reverse osmosis operation includes flowing the stream derived from the lithium extract into a plurality of reactors in series, each containing a semi-permeable membrane separating the reactor into a first volume and a second volume. The stream derived from the lithium extract flows as a non-permeating stream sequentially into the first volume of each reactor and a permeating stream flow sequentially into the second volume of each reactor counter-current to the preconcentrated stream. The non-permeating stream exiting the plurality of reactors yields the lithium concentrate and the permeating stream exiting the plurality of reactors yields the dilute brine stream. The method may include recycling a portion of the non-permeating stream at the exit of the plurality of reactors into the permeating stream. The method may include depressurizing the non-permeating stream before recycling it into the permeating stream.

Concentrating a stream derived from the lithium extract may include pressurizing the lithium extract, especially before the first membrane separation operation. The target pressure may be lower than membrane threshold pressure, in particular below 2000 psi.

The plurality of reactors may include 2 to 10, preferable 3 to 6, reactors. The lithium concentration range between the lithium concentrate and non-permeating stream may be between 2 and 20. The lithium concentration range between the lithium concentrate and dilute brine stream may be between 2 and 20. The TDS of the lithium concentration is over 120,000 mg/l and preferably over 200,000 mg/l. The lithium concentration of the lithium concentrate may be over 2.%, preferably over 3.3% weight.

In an embodiment the ion withdrawal process is a continuous counter-current adsorption desorption process.

The method may also comprise converting the lithium concentrate during a conversion stage. Lithium chloride from the lithium concentrate stream may be converted to lithium carbonate and/or hydroxide.

Extracting lithium from the brine source includes contacting a brine source stream with a lithium selective medium to load the medium with lithium and contacting an eluent stream with the lithium-loaded medium to form the lithium extract. In such embodiment, the permeate stream may recycled into the eluent stream. Alternatively or additionally, the brine source stream yields a lithium depleted brine stream after having contacting the lithium selective medium, and using at least a membrane separation operation or thermal vaporizer to yield a reject stream and a fresh water stream, wherein the fresh water stream is recycled, ie directed to any operation of the method especially having a fresh water need. The reject stream may be returned to the environment, ie reinjected in the geological formation.

The disclosure also relates to a method of recovering lithium from a brine source, comprising extracting lithium from the brine source using an ion withdrawal process to form a lithium extract; concentrating the lithium extract using one or more operations including at least a membrane separation operation, wherein the membrane separation operation includes a plurality of reactors in series each having a semi-permeable membrane, yields a lithium concentrate and a dilute brine stream, and is configured so that the lithium concentrate has a TDS over 120,000 mg/l, preferably over 200,000 mg/l, separating the dilute brine stream using a semi-permeable membrane into two streams including a permeate stream, wherein the permeate stream has a TDS under 2,000 mg/l, preferably under 500 mg/l, and recycling the permeate stream into another stream used in the method, for instance in the ion withdrawal process.

The method may include concentrating the lithium extract using a first membrane separation operation, having a first semi-permeable membrane to yield a preconcentrated stream and a second stream, concentrating the preconcentrated stream using a second membrane separation operation, wherein the at least one membrane separation is the second membrane operation, providing the dilute brine stream into the first membrane separation operation, wherein the second stream is the permeate stream.

In an embodiment, extracting lithium from the brine source includes contacting a brine source stream with a lithium selective medium to load the medium with lithium and contacting an eluent stream with the lithium-loaded medium to form the lithium extract and wherein the permeate stream is recycled into the eluent stream.

The at least one membrane operation is a counter-flow reverse osmosis operation, having a permeating stream and a non-permeating stream that flow sequentially in the plurality of reactors and counter-current, wherein the non-permeating stream yields the lithium concentrate and the permeating stream yields the dilute brine stream. In an embodiment, a portion of the non-permeating stream exiting the plurality of reactors is recycled into the permeating stream.

Concentrating the lithium extract may include pressurizing the lithium extract, especially before the membrane separation operation. The target pressure may be lower than membrane threshold pressure, in particular below 2000 psi.

The plurality of reactors may include 2 to 10, preferable 3 to 6, reactors. The lithium concentration range between the lithium concentrate and non-permeating stream may be between 2 and 20. The lithium concentration range between the lithium concentrate and dilute brine stream may be between 2 and 20. The lithium concentration of the lithium concentrate may be over 2.%, preferably over 3.3% weight.

In an embodiment the ion withdrawal process is a continuous counter-current adsorption desorption process.

The method may also comprise converting the lithium concentrate during a conversion stage. Lithium chloride from the lithium concentrate stream may be converted to lithium carbonate and/or hydroxide.

Extracting lithium from the brine source includes contacting a brine source stream with a lithium selective medium to load the medium with lithium and contacting an eluent stream with the lithium-loaded medium to form the lithium extract. In such embodiment, the permeate stream may recycled into the eluent stream. Alternatively or additionally, the brine source stream yields a lithium depleted brine stream after having contacting the lithium selective medium, and using at least a membrane separation operation or thermal vaporizer to yield a reject stream and a fresh water stream, wherein the fresh water stream is recycled, ie directed to any operation of the method especially having a fresh water need. The reject stream may be returned to the environment, ie reinjected in the geological formation.

We claim:

1. A method of recovering lithium from a brine source, comprising:
   extracting lithium from the brine source using an ion withdrawal process to form a lithium extract;
   concentrating a stream derived from the lithium extract using a counter-flow reverse osmosis operation, to yield a lithium concentrate and a dilute brine stream;
   using a reverse osmosis operation to separate the dilute brine stream into two streams including a permeate stream; and
   recycling the permeate stream,
   wherein the counter-flow reverse osmosis operation includes flowing the stream derived from the lithium extract into a plurality of reactors, each containing a semi-permeable membrane separating the reactor into a first volume and a second volume,
   wherein the stream derived from the lithium extract flows as a non-permeating stream sequentially into the first volume of each reactor and a permeating stream flows sequentially into the second volume of each reactor counter-current to the non-permeating stream, and
   wherein the non-permeating stream exiting the plurality of reactors yields the lithium concentrate and the permeating stream exiting the plurality of reactors yields the dilute brine stream.

2. The method of claim 1, wherein concentrating the stream derived from the lithium extract includes pressurizing the lithium extract at a target pressure below 2000 psi.

3. The method of claim 1, further comprising recycling a portion of the non-permeating stream at the exit of the plurality of reactors into the permeating stream.

4. The method of claim 3, further comprising depressurizing the non-permeating stream before recycling it into the permeating stream.

5. The method of claim 1, wherein extracting lithium from the brine source includes contacting a brine source stream with a lithium selective medium to load the medium with lithium and contacting an eluent stream with the lithium-loaded medium to form the lithium extract and wherein the permeate stream is recycled into the eluent stream.

6. The method of claim 1, wherein extracting lithium from the brine source includes contacting a brine source stream with a lithium selective medium to load the medium with lithium and contacting an eluent stream with the lithium-loaded medium to form the lithium extract and wherein the brine source stream yields a lithium depleted brine stream after having contacting the lithium selective medium, and using at least a membrane separation operation or thermal vaporizer to yield a reject stream and a fresh water stream, wherein the fresh water stream is recycled.

7. The method of claim 1, wherein the ion withdrawal process is a continuous counter-current adsorption desorption process.

* * * * *